United States Patent
You et al.

(10) Patent No.: US 10,158,253 B2
(45) Date of Patent: Dec. 18, 2018

(54) WIRELESS POWER RELAY DEVICE AND WIRELESS POWER TRANSMISSION SYSTEM

(71) Applicant: LS CABLE & SYSTEM LTD, Anyang-si, Gyeonggi-do (KR)

(72) Inventors: Sung-Han You, Seoul (KR); Young-Sun Kim, Gunpo-si (KR); Un-Kyu Park, Hwaseong-si (KR)

(73) Assignee: LS CABLE & SYSTEM LTD., Anyang-si, Gyeonggi-Do (KR)

( * ) Notice: Subject to any disclaimer, the term of this patent is extended or adjusted under 35 U.S.C. 154(b) by 92 days.

(21) Appl. No.: 15/308,219

(22) PCT Filed: May 2, 2014

(86) PCT No.: PCT/KR2014/003980
§ 371 (c)(1),
(2) Date: Nov. 1, 2016

(87) PCT Pub. No.: WO2015/167054
PCT Pub. Date: Nov. 5, 2015

(65) Prior Publication Data
US 2017/0054330 A1    Feb. 23, 2017

(51) Int. Cl.
*H02J 50/50*    (2016.01)
*H02J 50/12*    (2016.01)
*H01F 38/14*    (2006.01)
*H02J 7/02*    (2016.01)

(52) U.S. Cl.
CPC ............. *H02J 50/12* (2016.02); *H01F 38/14* (2013.01); *H02J 7/025* (2013.01); *H02J 50/50* (2016.02)

(58) Field of Classification Search
CPC ........................................................ H02J 50/50
See application file for complete search history.

(56) References Cited

U.S. PATENT DOCUMENTS

| | | | |
|---|---|---|---|
| 2010/0201201 A1* | 8/2010 | Mobarhan | H02J 5/005 307/104 |
| 2011/0175455 A1 | 7/2011 | Hashiguchi | |
| 2011/0187320 A1 | 8/2011 | Murayama | |
| 2012/0001497 A1* | 1/2012 | Sada | H02J 5/005 307/104 |
| 2014/0021796 A1 | 1/2014 | Song et al. | |

(Continued)

FOREIGN PATENT DOCUMENTS

| | | |
|---|---|---|
| JP | 2011-147280 A | 7/2011 |
| JP | 2011-160505 A | 8/2011 |

(Continued)

OTHER PUBLICATIONS

International Search Report for PCT/KR2014/003980 dated Jan. 27, 2015 from Korean Intellectual Property Office.

*Primary Examiner* — Rexford Barnie
*Assistant Examiner* — David Shiao
(74) *Attorney, Agent, or Firm* — K&L Gates LLP

(57) ABSTRACT

The present invention is mainly directed to providing a wireless power relay device and a wireless power transmission system, which are capable of reinforcing a relay coil in which a high voltage is induced among a plurality of relay coils, thereby preventing the relay coil from being damaged due to the induction of the high voltage.

12 Claims, 6 Drawing Sheets

(56) References Cited

U.S. PATENT DOCUMENTS

| | | | | |
|---|---|---|---|---|
| 2014/0028112 A1* | 1/2014 | Hui | ............ | H02J 5/005 |
| | | | | 307/104 |
| 2014/0044293 A1* | 2/2014 | Ganem | ............ | H02J 7/025 |
| | | | | 381/323 |
| 2014/0142876 A1* | 5/2014 | John | ............ | H02J 5/005 |
| | | | | 702/60 |
| 2014/0203773 A1* | 7/2014 | Kim | ............ | H02J 17/00 |
| | | | | 320/108 |
| 2015/0008753 A1* | 1/2015 | Park | ............ | H03H 7/40 |
| | | | | 307/104 |
| 2015/0045227 A1* | 2/2015 | Ahn | ............ | H01F 38/14 |
| | | | | 505/163 |
| 2015/0115725 A1* | 4/2015 | Kang | ............ | H01F 38/14 |
| | | | | 307/104 |
| 2016/0172892 A1* | 6/2016 | Satyamoorthy | ......... | H02J 7/025 |
| | | | | 320/108 |

FOREIGN PATENT DOCUMENTS

| | | |
|---|---|---|
| JP | 2011-160634 A | 8/2011 |
| JP | 2012-075304 A | 4/2012 |
| JP | 2013-223303 A | 10/2013 |
| KR | 10-2010-0128395 A | 12/2010 |
| KR | 10-2012-0040779 A | 4/2012 |
| KR | 10-2014-0008020 A | 1/2014 |

* cited by examiner

WIRELESS POWER RELAY DEVICE AND WIRELESS POWER TRANSMISSION SYSTEM

CROSS REFERENCE TO PRIOR APPLICATION

This application is a National Stage Patent Application of PCT International Patent Application No. PCT/KR2014/003980 (filed on May 2, 2014) under 35 U.S.C. § 371, which is hereby incorporated by reference in its entirety.

TECHNICAL FIELD

One embodiment of the present invention relates to a wireless power relay device and a wireless power transmission system using the same.

BACKGROUND ART

Wireless power transmission is a technique of wirelessly supplying power to household appliances or electric cars rather than using a power line which is an existing cable. This technique is advantageous in that a device which needs to be supplied power can be charged wirelessly without having to connect the device to a power outlet using a power cable. Thus, research related thereto has been actively conducted.

Wireless power transmission techniques are largely divided into a magnetic induction method, a magnetic resonance method, and a microwave method. The microwave method is a technique of transmitting power by emitting super-high-frequency electromagnetic waves such as microwaves via an antenna. When the microwave method is used, long-distance wireless power transmission may be performed but a safety problem caused by electromagnetic waves should be considered. The magnetic induction method is a technique using magnetic inductive coupling between adjacent coils, wherein the distance between two power transmission/reception coils is several centimeters or less and transmission efficiency depends greatly on the arrangement of the two coils. The magnetic resonance method is a technique of transmitting non-radial magnetic-field energy between two resonators spaced from each other through resonant coupling, wherein wireless power transmission may be performed when the distance between power transmission/reception coils is about 1 to 2 m. The magnetic resonance method is more advantageous than the magnetic induction method, in that it is relatively flexible in the arrangement of two coils and a range of wireless charging may be extended using relay coils.

However, when a magnetic field generated by a wireless power transmitter is relayed to wireless power receivers through relay coil, a high voltage may be induced in the relay coil according to a change in the location and number of the wireless power receivers and thus a capacitor included in the relay coil or the like may be damaged.

In this connection, the invention entitled "Device and Method for Non-Contact Power Transmission" has been disclosed in Korean laid-open patent application No. 2010-0128395. The invention in Korean laid-open patent application No. 2010-0128395 concerns a non-contact power transmission system which transmits power to a mobile device through electromagnetic induction between primary coils of a main device and secondary coils of the mobile device. This system includes a power transmission surface on which several primary coils configured to induce an electric field are two-dimensionally arranged. The secondary coils of the mobile device are two or three times in size than the primary coils.

However, the invention in Korean laid-open patent application No. 2012-0128395 is not related to a relay coil system for magnetic-resonance wireless power transmission. This invention simply discloses a structure in which several primary coils are arranged in a horizontal direction but does not disclose a problem that a high voltage is applied to a relay coil at a specific location and a solution thereto.

The invention disclosed in Japanese laid-open patent application No. 2012-0075304 concerns a relay coil system for magnetic-resonance wireless power transmission, and discloses a structure in which several relay coils are arranged in a direction of a plane. However, the invention in Japanese laid-open patent application No. 2012-0075304 does not disclose a problem that an overvoltage is generated at a relay coil at a specific location and a solution thereto.

The invention disclosed in Korean laid-open patent application No. 2012-0040779 concerns a relay coil system for magnetic-resonance wireless power transmission but does not disclose a problem that an overvoltage is generated at a relay coil at a specific location and a solution thereto. Furthermore, a structure in which the number of turns of a base coil which is a transmission coil is less than the number of turns of relay coils, disclosed in this invention, is different from a technical solution suggested in the preset invention.

DETAILED DESCRIPTION OF THE INVENTION

Technical Problem

The present invention is mainly directed to providing a wireless power relay device and a wireless power transmission system, which are capable of reinforcing a relay coil in which a high voltage is induced among a plurality of relay coils, thereby preventing the relay coil from being damaged due to the induction of the high voltage.

Purposes of the present invention are not, however, limited thereto, and any further purposes thereof will become apparent and more readily appreciated from the following description.

Technical Solution

According to an aspect of the present invention, a wireless power relay device comprises a plurality of relay coils configured to relay power transmission by capturing a magnetic field, wherein power is transmitted through the magnetic field to a predetermined point among points at which the plurality of relay coils are arranged, wherein a relay coil at the predetermined point has a larger impedance value than impedance values of the other relay coils.

When location or a number of load resistors which are adjacent to the relay coil at the predetermined point and transmit the power is changed, a higher voltage may be induced in the relay coil at the predetermined point than the other relay coils.

When the plurality of relay coils are arranged in a line, a higher voltage may be induced in the relay coil at the predetermined point than the other relay coils.

The relay coil at the predetermined point may have a smaller resistance value than resistance values of the other relay coils.

A number of turns of the relay coil at the predetermined point may be less than numbers of turns of the other relay coils.

The relay coil at the predetermined point may have a greater mutual inductance value than mutual inductance values the other relay coils.

The relay coil at the predetermined point may have a greater coupling coefficient K than coupling coefficients of the other relay coils.

A distance between the relay coil at the predetermined point and a least one among relay coils neighboring the relay coil may be less than distances between the other relay coils.

According to another aspect of the present invention, a wireless power relay device comprising a plurality of relay coils configured to relay power transmission by capturing a magnetic field, wherein power is transmitted to a predetermined point through the magnetic field among points at which the relay coils are arranged, wherein a relay coil in which a voltage which is greater than or equal to a withstanding voltage allowable in a capacitor thereof is induced among relay coils which are in a path in which the magnetic field is transmitted to the predetermined point has a higher impedance value than impedance values of the other relay coils which are in the path in which the magnetic field is transmitted to the predetermined point.

When location or a number of load resistors which are adjacent to the relay coil at the predetermined point and transmit power is changed, a higher voltage may be induced in the relay coil at the predetermined point than the other relay coils.

When location or a number of load resistors which are adjacent to the relay coil at the predetermined point and transmit power is changed, a higher voltage is induced in the relay coil at the predetermined point than the other relay coils.

The relay coil at the predetermined point may have a lower resistance value than resistance values of the other relay coils.

The relay coil at the predetermined point may have a greater mutual inductance value than mutual inductance values of the other relay coils.

The relay coil at the predetermined point may have a greater coupling coefficient K than coupling coefficients of the other relay coils.

A distance between the relay coil at the predetermined point and at least one among relay coils neighboring the relay coil may be less than distances between the other relay coils.

According to the other aspect of the present invention, a wireless power transmission system may comprises a wireless power transmission device configured to transmit power through a magnetic field and a plurality of relay coils configured to capture and relay the magnetic field, wherein the wireless power transmission system transmits power to a predetermined point through the magnetic field among points at which the plurality of relay coils are arranged, wherein a relay coil in which a voltage which is greater than or equal to a withstanding voltage allowable in a capacitor thereof is induced among relay coils which are in a path in which the magnetic field is transmitted to the predetermined point has a higher impedance value than impedance values of the other relay coils which are in the path in which the magnetic field is transmitted to the predetermined point.

When location or a number of load resistors which are adjacent to the relay coil at the predetermined point and transmit the power is changed, a higher voltage may be induced in the relay coil at the predetermined point than the other relay coils.

When the plurality of relay coils are arranged in a line, a higher voltage may be induced in the relay coil at the predetermined point than the other relay coils.

The relay coil at the predetermined point may have a lower resistance value than resistance values of the other relay coils.

A number of turns of the relay coil at the predetermined point may be less than numbers of turns of the other relay coils.

The relay coil at the predetermined point has a larger mutual inductance value than mutual inductance values of the other relay coils.

The relay coil at the predetermined point may have a larger coupling coefficient K than coupling coefficients of the other relay coils.

A distance between the relay coil at the predetermined point and at least one among relay coils neighboring the relay coil may be less than distances between the other relay coils.

Advantageous Effects

According to an embodiment of the present invention, a relay coil in which a high voltage is induced among a plurality of relay coils may be reinforced to prevent the relay coil from being damaged due to the induction of the high voltage.

MODE OF THE INVENTION

Figure 1:
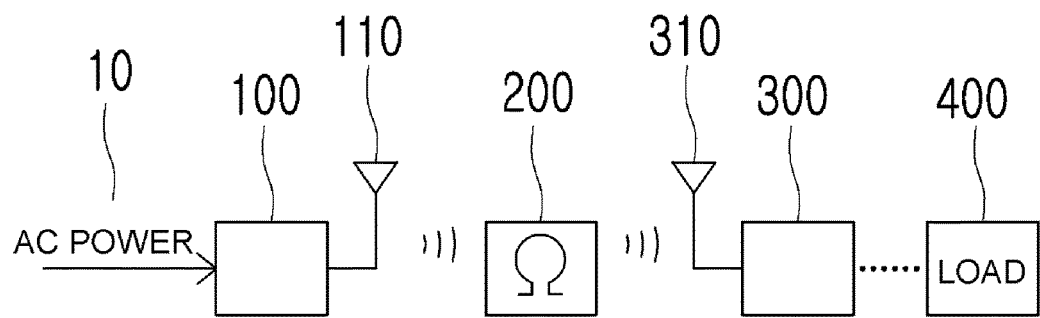
FIG. 1 is a schematic diagram of a wireless power transmission system according to an embodiment of the present invention.

The present invention may be embodied in many different forms and accomplished in various embodiments. Thus, exemplary embodiments are illustrated in the drawings and described in detail in the present disclosure. However, the present invention is not limited thereto and should be understood to cover all modifications, equivalents, and alternatives falling within the technical idea and scope of the invention.

In describing the preset invention, well-known techniques are not described in detail if it is determined that they would obscure the invention due to unnecessary detail. As used herein, ordinal numbers (e.g., first, second, etc.) are merely signs for distinguishing one element from another element.

In the present disclosure, it will be understood that when an element is referred to as being 'coupled' or 'connected' to another element, the element may be directly coupled or connected to another element but may be coupled to connected to another element via an intervening element unless otherwise indicated.

In the present disclosure, a wireless power receiving device is an electric/electronic device including a chargeable battery therein or a device connected to an external electric/electronic device to supply charging current. The wireless power receiving device may be a mobile device (such as a mobile phone, a smart phone, a laptop computer, a digital broadcasting terminal, a personal digital assistant (PDA), a portable multimedia player (PMP), or a navigation device) or an electronic device (such as a wall-mounted television (TV), a desk lamp, an electronic picture frame, or a vacuum cleaner).

Hereinafter, embodiments of the present invention will be described in detail with reference to the accompanying drawings.

FIG. 1 is a schematic diagram of a wireless power transmission system according to an embodiment of the present invention.

As illustrated in FIG. 1, a wireless power transmission system according to the present invention includes a wireless power transmission device 100, and a wireless power relay device 200 including at least one relay coil. The wireless power relay device 200 is provided in a path from the wireless power transmission device 100 to a wireless power receiving device 300 and relays a power signal to the wireless power receiving device 300 according to the magnetic resonance method.

The wireless power transmission device 100 generates a magnetic field to transmit power. The wireless power relay device 200 relays the magnetic field to the wireless power receiving device 300 by using a plurality of relay coils which magnetically resonate with the magnetic field. The wireless power receiving device 300 is coupled to the magnetic field relayed by the wireless power relay device 200 to generate output power to be stored or consumed therein.

The wireless power transmission device 100, the wireless power relay device 200, and the wireless power receiving device 300 are configured to have a mutual resonance relationship at a specific frequency. When resonant frequencies of adjacent devices are the same or substantially the same, power transmission efficiency between these devices is inversely proportional to the square of the distance between these devices.

The wireless power transmission device 100 includes a power transmission coil 110 as a power transmission means, and converts an external input power source 10 into a radio-frequency (RF) power signal of a desired frequency and supplies it to the power transmission coil 110 to generate a magnetic field around the power transmission coil 110.

The wireless power receiving device 300 includes a power reception coil 310 as a power reception means, and receives the RF power signal from the magnetic field via the power reception coil 310 coupled to either the power transmission coil 110 or a relay coil of the wireless power relay device 200 adjacent to the power transmission coil 110 in a resonant state at a specific frequency. The received RF power signal is converted into a DC power output, and used as power for driving the wireless power receiving device 300 or supplied to a battery or an external load device 400.

The wireless power relay device 200 may include at least one relay coil. The at least one relay coil may be arranged at a regular interval. A diameter of the at least one relay coil and the number of turns thereof may be set to maximize of wireless power transmission efficiency. Each of the at least one relay coil may include a coil 210 wound a certain number of times, and a capacitor 220 connected in parallel to the coil 210 for a purpose of resonating and impedance matching as illustrated in FIG. 2A.

Figure 2A:
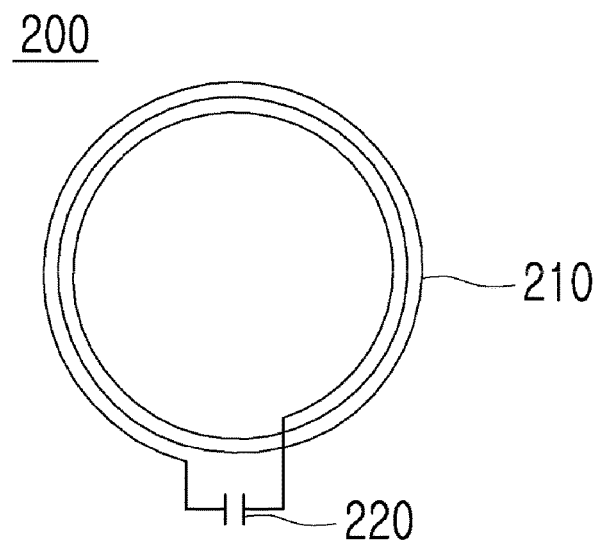
FIGS. 2A and 2B are diagrams illustrating an inner structure of a relay coil of a wireless power relay device according to an embodiment of the present invention, and a circuit including the same.
Figure 2B:
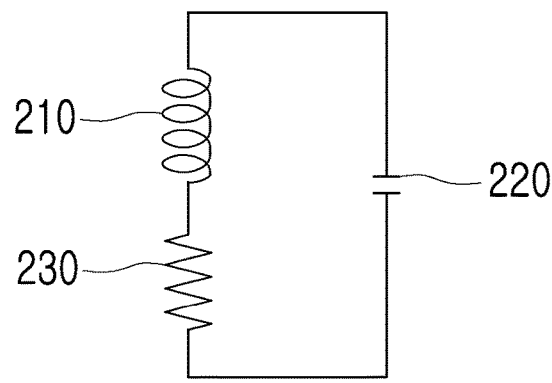

FIG. 2B illustrates an equivalent circuit including the coil 210 of FIG. 2A, an internal resistor 230 of the coil 210, and the capacitor 220. A resonant frequency at which a relay coil operates may be set by controlling a value L of the coil 210 and a value C of the capacitor 220. For example, the value L of the coil 210 may be measured to determine a desired resonant frequency, and the value C of the capacitor 220 may be controlled to set the desired resonant frequency as a resonant frequency.

Figure 3A:
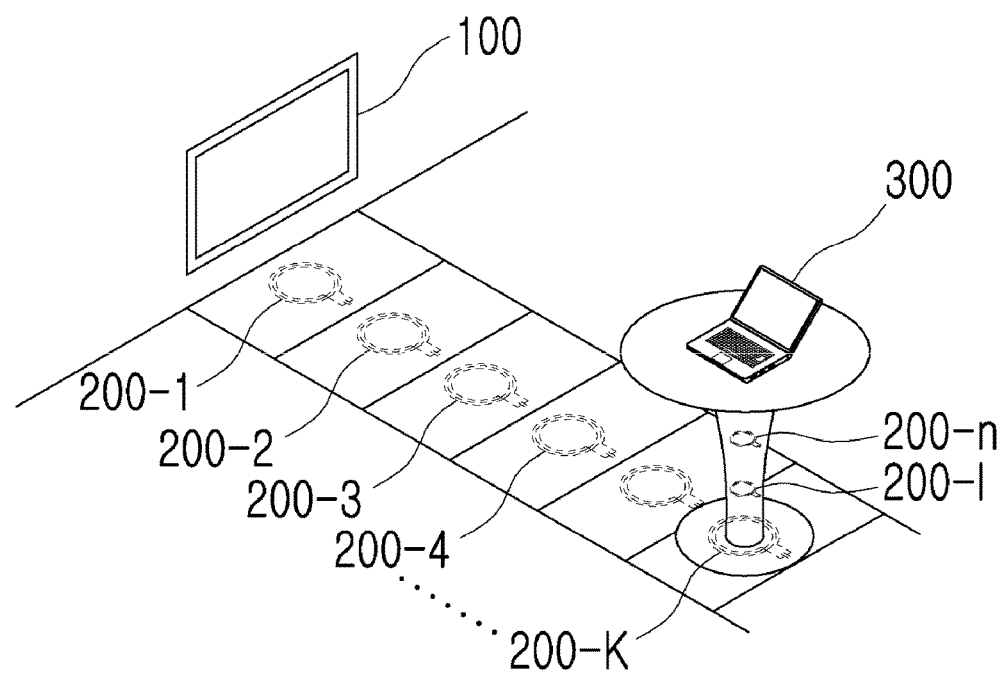
FIGS. 3A to 3C are perspective views of examples of the wireless power transmission system of FIG. 1.

FIG. 3A illustrates a wireless power transmission system including a wireless power relay device according to an embodiment of the present invention. Referring to FIG. 3A, a wireless power receiving device 300 according to the present invention may be apart from a wireless power transmission device 100 by a predetermined distance, and a wireless power relay device 200 including at least one relay coil, e.g., relay coils 200-1 to 200-n, may be provided between the wireless power receiving device 300 and the wireless power transmission device 100 to relay a magnetic field generated by the wireless power transmission device 100 to the wireless power receiving device 300. That is, the wireless power relay device 200 may include a plurality of relay coils which relay transmission of power by capturing the magnetic field generated by the wireless power transmission device 100, and may transmit the power to a predetermined point through the magnetic field among points at which the plurality of relay coils are arranged. The predetermined point may be a point at which the wireless power receiving device 300 is located.

In this case, the relay coil may be installed at the bottom of a corresponding place. In some cases, the relay coil may be installed on a table or the like to wireless transmit power to a predetermined height from the bottom, similar to the relay coils 200-1 to 200-n.

As described above, if the wireless power relay device 200 includes a plurality of relay coils, a sharp impedance change occurs in a relay coil at a specific location, and particularly, the relay coil 200-n coupled directly to the wireless power receiving device 300 through a magnetic field when the location of the wireless power receiving device 300 or the number thereof is significantly changed. Thus, a high voltage is induced in the relay coil 200-n and thus the capacitor 220 of the relay coil 200-n may be broken, thereby causing damage to the relay coil 200-n or preventing the wireless power relay device 200 from being operated. A location on the wireless power relay device 200 on which a high voltage is frequently induced as descried above is referred to as a high-voltage inducing sector. The high-voltage inducing sector means a region in which a high voltage is induced for a short time as the wireless power receiving device 300 is powered off or the wireless power receiving device 300 is away from the wireless power relay device 200. In the case of a relay coil arranged on the high-voltage inducing sector, a voltage which is greater than or equal to an allowable voltage is applied to the capacitor 220 of the relay coil for a short time and thus the capacitor 220 may be broken.

For example, when the wireless power receiving device 300 to which power is supplied via a last relay coil is away from the plurality of relay coils at a high speed, a voltage of the last relay coil may increase for a short time to exceed the allowable voltage. In this case, the increase in the voltage of the last relay coil is inversely proportional to the sum of impedance values of the preceding relay coils and is proportional to an impedance value of the wireless power receiving device 300.

Thus, in order to minimize influences caused by a high voltage occurring at the relay coil arranged on the high-voltage inducing sector, the sum of impedance values of the relay coil on the high-voltage inducing sector and the preceding relay coils should be increased or the impedance value of the wireless power receiving device 300 should be decreased. Here, the impedance value of each of the plurality of relay coils is proportional to the square of a frequency and a mutual inductance value between neighboring relay coils, and is inversely proportional to a resistance value of each of the plurality of relay coils.

As described above, the high-voltage inducing sector may correspond to an end portion of the wireless power relay device 200, e.g., a region of the relay coil 200-$n$ next to the wireless power receiving device 300 as illustrated in FIG. 3A. However, the present invention is not limited thereto, and a high-voltage inducing sector may occur in a region in which at least one relay coil among the plurality of relay coils of the wireless power relay device 200 is located. That is, referring to FIG. 3A, a relatively high voltage may be induced in a relay coil among the relay coils 200-1, 200-2, ..., 200-($n$–1) other than the relay coil 200-$n$ next to the wireless power receiving device 300. In this case, the relay coil arranged on the high-voltage inducing sector has a higher impedance value than those of the other relay coils and may be thus prevented from being broken due to induction of a high voltage, as will be described below.

Figure 3B:
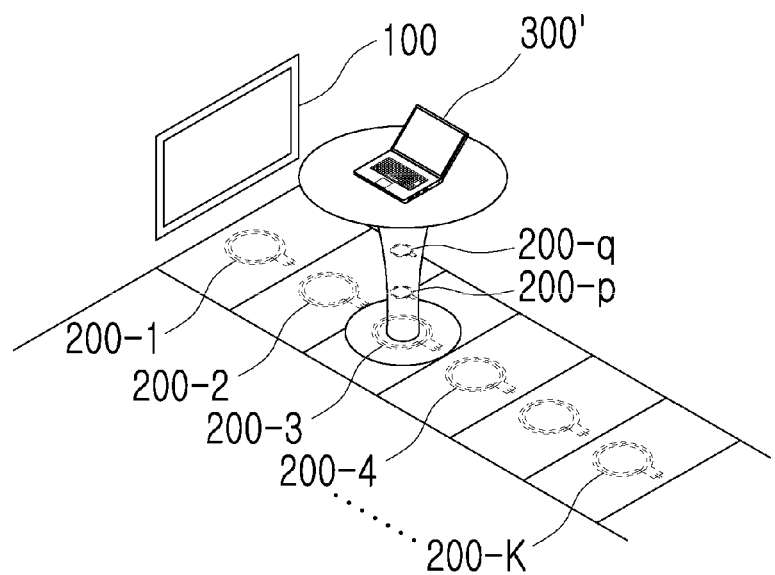

FIG. 3B is a diagram illustrating a case in which the wireless power receiving device 300 is located on a location on the wireless power relay device 200 other than an end portion of the wireless power relay device 200.

Referring to FIG. 3B, a wireless power receiving device 300' is not arranged on an end portion of the wireless power relay device 200, i.e., the relay coil 200-K farthest away from the wireless power transmission device 100, and may be arranged on a relay coil 200-$q$ above the relay coil 200-3 among the plurality of relay coils of the wireless power relay device 200. In this case, when a displacement of the wireless power receiving device 300 which is a load resistor with respect to the relay coil 200-$q$ changes as the wireless power receiving device 300 becomes away from or becomes close to the relay coil 200-$q$, a high voltage, i.e., a voltage which is greater than or equal to a withstanding voltage allowable in a capacitor in the relay coil 200-$q$, may be induced in the relay coil 200-$q$ and thus the capacitor in the relay coil 200-$q$ may be broken.

Figure 3C:
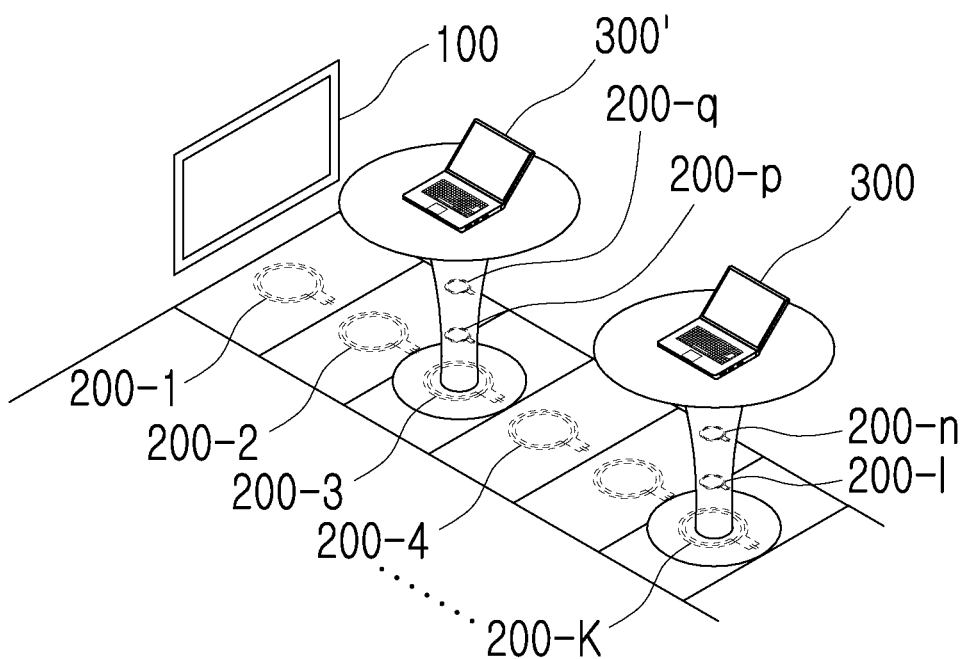

FIG. 3C is a diagram illustrating a case in which the wireless power receiving device 300 is arranged on an end portion of the wireless power relay device 200 and a non-end portion of the wireless power relay device 200.

Referring to FIG. 3C, wireless power receiving devices 300 and 300' may be arranged on an end portion of the wireless power relay device 200, i.e., the relay coil 200-K farthest from the wireless power transmission device 100, and a non-end portion of the wireless power relay device 200, e.g., the relay coil 200-3 among the plurality of relay coils. In this case, similarly, when a displacement of the wireless power receiving devices 300 and 300' which are load resistors with respect to the relay coils 200-$n$ and 200-$q$ changes as the wireless power receiving devices 300 and 300' become away from or close to the relay coils 200-$n$ and 200-$q$, a high voltage, i.e., a voltage which is greater than or equal to a withstanding voltage allowable in capacitors of the relay coils 200-$n$ and 200-$q$, may be induced in the relay coils 200-$n$ and 200-$q$ and thus the capacitors of the relay coils 200-$n$ and 200-$q$ may be broken.

A structure of the wireless power relay device 200 according to the present invention, which is capable of preventing a relay coil from being damaged by a high voltage occurring at a high-voltage inducing sector due to a change in an impedance value, caused by a change in the location of the wireless power receiving device 300 or the number of the wireless power receiving device 300 will be described below.

Figure 4:
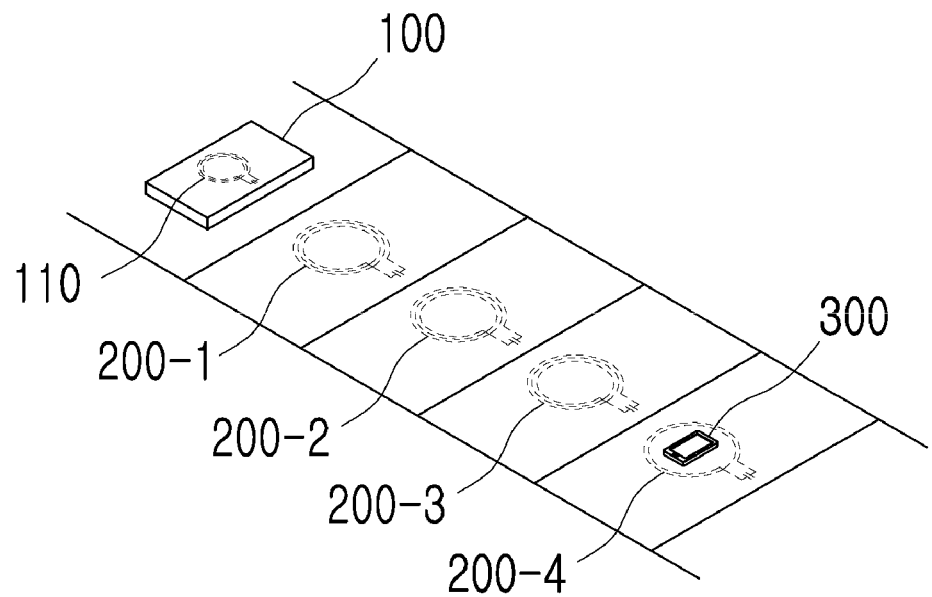
FIG. 4 is a diagram illustrating structural characteristics of a wireless power relay device.

As illustrated in FIG. 4, in a wireless power relay device 200 according to the present invention, relay coils 200-1 to 200-4 are arranged at regular intervals between the wireless power transmission device 100 and the wireless power receiving device 300. In the wireless power relay device 200, the number of turns of the relay coil 200-4 on a high-voltage inducing sector, i.e., a region in which the wireless power receiving device 300 is located, may be less than the numbers of turns of the relay coils 200-1 to 200-3 on different locations. Accordingly, a resistance value Rn of the relay coil 200-4 on the high-voltage inducing sector decreases and thus an impedance value Zn thereof relatively increases.

Figure 5:
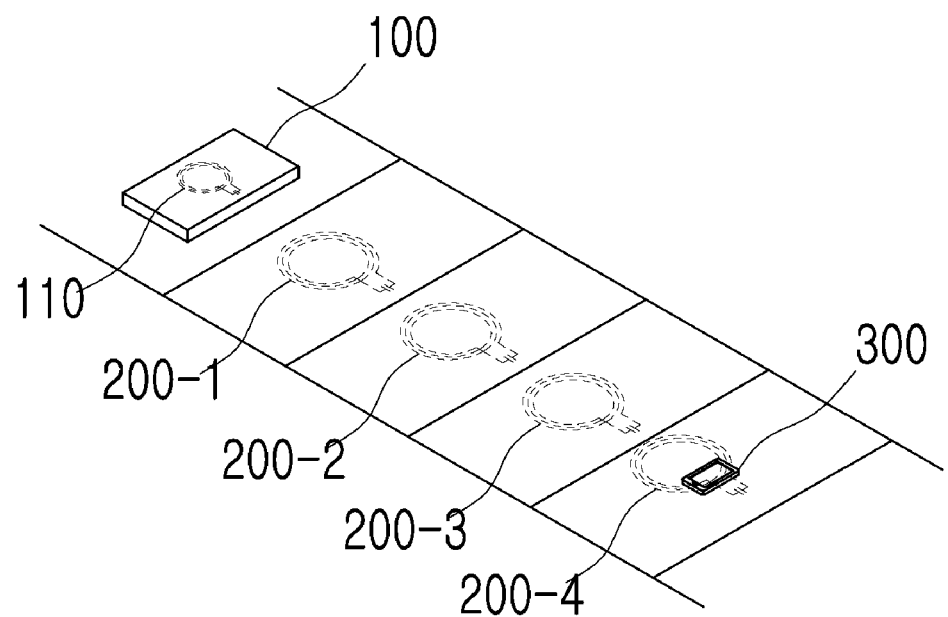
FIG. 5 is another diagram illustrating structural characteristics of a wireless power relay device.

As illustrated in FIG. 5, in a wireless power relay device 200 according to the present invention, a relay coil 200-4 on a high-voltage inducing sector may be located adjacent to a relay coil 200-3 in front of the relay coil 200-4 so as to increase a coupling coefficient k of the relay coil 200-4 on the high-voltage inducing sector, thereby increasing a mutual inductance value MnK of the relay coil 200-4 on the high-voltage inducing sector. Thus, an impedance value Zn of the relay coil 200-4 on the high-voltage inducing sector relatively increases.

Figure 6:
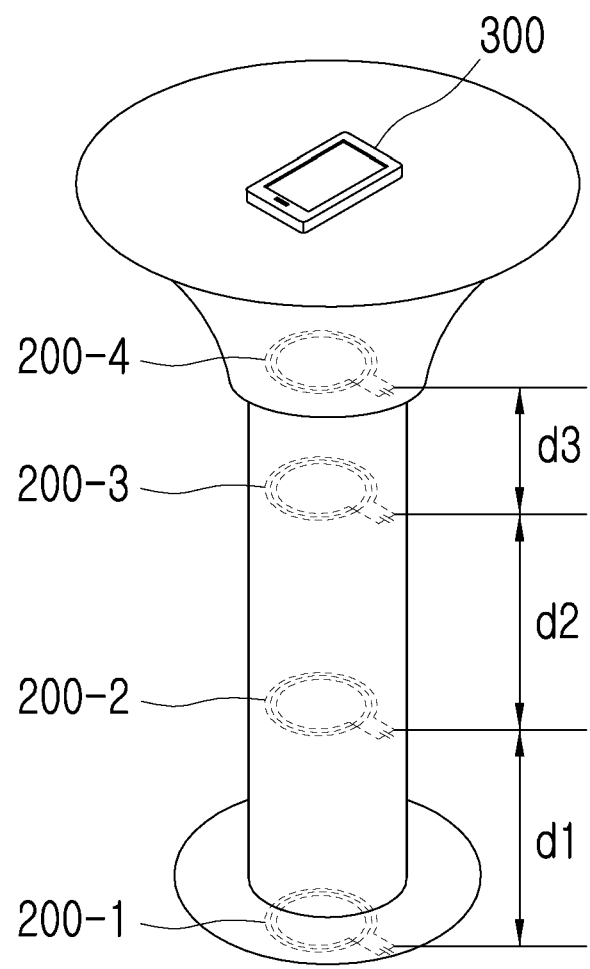
FIG. 6 is another diagram illustrating structural characteristics of a wireless power relay device.

The wireless power relay device 200 in which relay coils extend vertically may have the above structure. As illustrated in FIG. 6, when the relay coils 200-1 to 200-4 of the wireless power relay device 200 are coupled to a table or the like to vertically extend a wireless power transmission region, a high-voltage inducing sector may be the relay coil 200-4 installed on a top of the table on which the wireless power receiving device 300 is located. In this case, the distance d3 between the relay coil 200-4 on the high-voltage inducing sector and the relay coil 200-3 in front of the relay coil 200-4 is set to be less than the distance d1 between the relay coils 200-1 and 200-2 and the distance d2 between the relay coils 200-2 and 200-3, so that the mutual inductance value MnK of the relay coil 200-4 on the high-voltage inducing sector may be increased to relatively increase the impedance value Zn.

Figure 7:
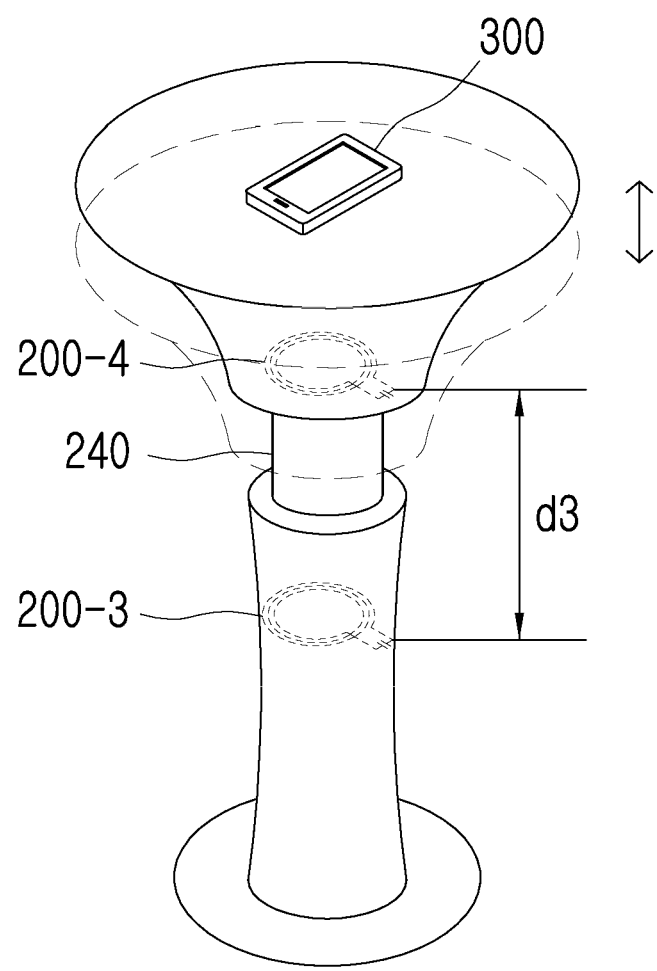
FIG. 7 is another diagram illustrating structural characteristics of a wireless power relay device.

In another embodiment, as illustrated in FIG. 7, a distance adjustment part 240 may be further provided to adjust the distance d3 between a relay coil 200-4 on a high-voltage inducing sector installed on a table and a relay coil 200-3 in front of the relay coil 200-4.

As another method of increasing the mutual inductance value MnK of the relay coil 200-4 on the high-voltage inducing sector, an inductance value may be increased by increasing the number of turns of the relay coil 200-3 in front of the high-voltage inducing sector.

Through the structures described above, the wireless power relay device 200 and a wireless power transmission system including the same according to the present invention are capable of reinforcing a relay coil in a region in which a high voltage is induced or a relay coil in front of the relay coil without an additional circuit for monitoring and handling a high voltage. Thus, the relay coil may be prevented from being damaged due to induction of a high voltage, thereby performing reliable wireless power transmission.

The above description is merely intended to describe examples of the technical idea of the present invention. Thus, the present invention may be embodied in many different forms without departing from the scope of the invention by those of ordinary skill in the technical field to which the invention pertains.

Thus, the embodiments set forth herein are not intended to restrict the scope of the present invention and are only provided to describe the technical idea of the present invention. Thus, the scope of the present invention should not be construed as being limited to these embodiments.

Therefore, the scope of the invention should be defined by the appended claims, and all differences within the scope will be construed as being included in the present invention.

The invention claimed is:

1. A wireless power relay device comprising:
 a plurality of relay coils arranged at respective points, and configured to relay power transmission by capturing a magnetic field transmitted by a wireless power transmission device to provide to at least one wireless power receiving device,
 wherein power is wirelessly transmitted from the wireless power transmission device through a subset of the plurality of relay coils in a path to a relay coil at a predetermined point which is farthest away from the wireless power transmission device at an end portion of the wireless power relay device,
 wherein the wireless power relay device is configured such that, of the plurality of relay coils, the relay coil at the predetermined point is closest to the at least one wireless power receiving device,
 wherein the relay coil at the predetermined point has a larger impedance value than impedance values of other relay coils of the subset of the plurality of relay coils in the path to prevent induction of high voltage in the relay coil at the predetermined point.

2. The wireless power relay device of claim 1, wherein a resistance value of the relay coil at the predetermined point is smaller than resistance values of the other relay coils of the subset of the plurality of relay coils in the path.

3. The wireless power relay device of claim 2, wherein a number of turns of the relay coil at the predetermined point is less than a number of turns of each of the other relay coils of the subset of the plurality of relay coils in the path.

4. The wireless power relay device of claim 1, wherein a mutual inductance between the relay coil at the predetermined point and a nearest relay coil among the subset of the plurality of relay coils in the path is greater than mutual inductance values between the other relay coils of the subset of the plurality of relay coils in the path.

5. The wireless power relay device of claim 4, wherein a coupling coefficient K between the relay coil at the predetermined point and the nearest relay coil among the subset of the plurality of relay coils in the path is greater than coupling coefficient values between the other relay coils of the subset of the plurality of relay coils in the path.

6. The wireless power relay device of claim 5, wherein a distance between the relay coil at the predetermined point and the nearest relay coil among the subset of the plurality of relay coils is less than distances between the other relay coils of the subset of the plurality of relay coils in the path.

7. A wireless power transmission system comprising:
 a wireless power transmission device configured to transmit power through a magnetic field; and
 a plurality of relay coils arranged at respective points, and configured to capture and relay the magnetic field transmitted by the wireless power transmission device to provide to at least one wireless power receiving device,
 wherein the wireless power transmission system transmits power through a subset of the plurality of relay coils in a path to a relay coil at a predetermined point which is farthest away from the wireless power transmission device at an end portion of the wireless power relay device,
 wherein the relay coil at the predetermined point has a higher impedance value than impedance values of other relay coils of the subset of the plurality of relay coils in the path to prevent induction of high voltage in the relay coil at the predetermined point.

8. The wireless power transmission system of claim 7, wherein a resistance value of the relay coil at the predetermined point is lower than resistance values of the other relay coils of the subset of the plurality of relay coils in the path.

9. The wireless power transmission system of claim 8, wherein a number of turns of the relay coil at the predetermined point is less than a number of turns of each of the other relay coils of the subset of the plurality of relay coils in the path.

10. The wireless power transmission system of claim 7, wherein a mutual inductance value between the relay coil at the predetermined point and a nearest relay coil among the subset of the plurality of relay coils in the path is larger than mutual inductance values between the other relay coils of the subset of the plurality of relay coils in the path.

11. The wireless power transmission system of claim 10, wherein a coupling coefficient K between the relay coil at the predetermined point and the nearest relay coil among the subset of the plurality of relay coils in the path is larger than coupling coefficient values between the other relay coils of the subset of the plurality of relay coil.

12. The wireless power transmission system of claim 11, wherein a distance between the relay coil at the predetermined point and the nearest relay coil among the subset of the plurality of relay coils is less than distances between the other relay coils of the subset of the plurality of relay coils in the path.

* * * * *